Dec. 14, 1954   A. J. SEILER   2,696,865
METHOD OF AND APPARATUS FOR FABRICATING CONVEYER BELTING
Filed Jan. 28, 1952   4 Sheets-Sheet 1

INVENTOR:
Arthur J. Seiler,
BY Paul & Paul
ATTORNEYS.

Dec. 14, 1954     A. J. SEILER     2,696,865
METHOD OF AND APPARATUS FOR FABRICATING CONVEYER BELTING
Filed Jan. 28, 1952     4 Sheets-Sheet 2

INVENTOR:
Arthur J. Seiler,
BY Paul & Paul
ATTORNEYS.

Dec. 14, 1954  A. J. SEILER  2,696,865
METHOD OF AND APPARATUS FOR FABRICATING CONVEYER BELTING
Filed Jan. 28, 1952  4 Sheets-Sheet 3
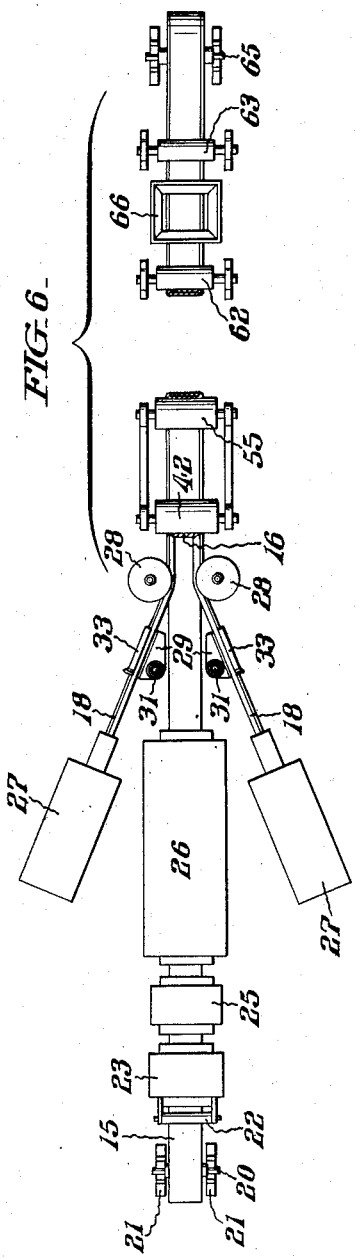
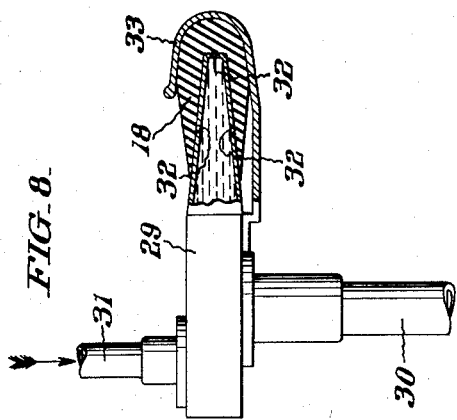
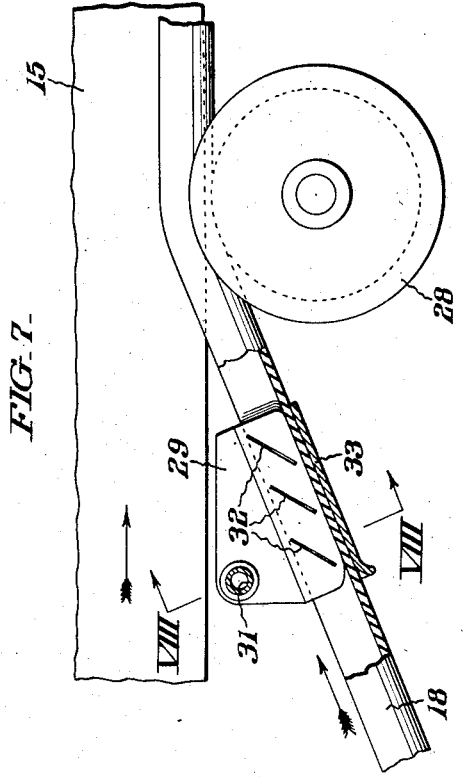
INVENTOR:
Arthur J. Seiler,
BY Paul & Paul
ATTORNEYS.

Dec. 14, 1954   A. J. SEILER   2,696,865
METHOD OF AND APPARATUS FOR FABRICATING CONVEYER BELTING
Filed Jan. 28, 1952   4 Sheets-Sheet 4
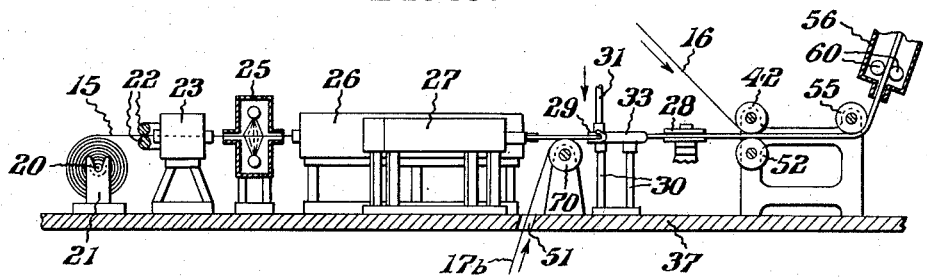
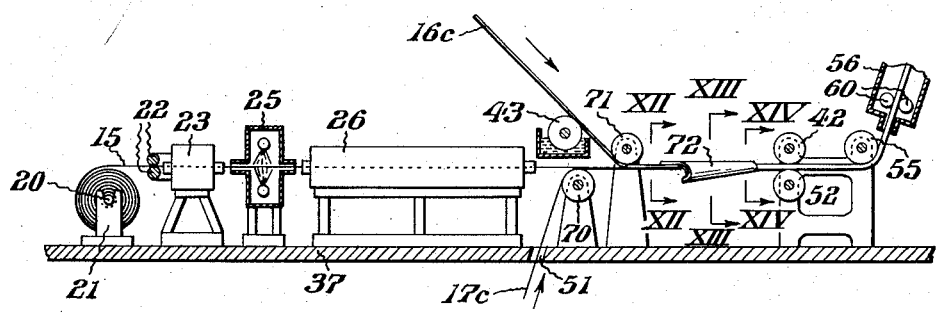
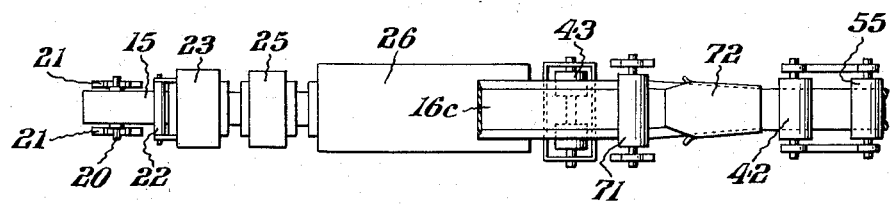
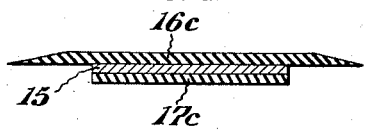
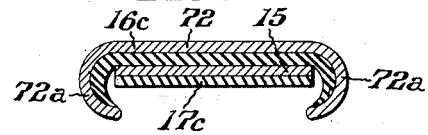
INVENTOR:
Arthur J. Seiler,
BY
ATTORNEYS.

United States Patent Office 2,696,865
Patented Dec. 14, 1954

2,696,865

METHOD OF AND APPARATUS FOR FABRICATING CONVEYER BELTING

Arthur J. Seiler, Philadelphia, Pa., assignor to Main Products Corporation, Philadelphia, Pa., a corporation of Pennsylvania Application January 28, 1952, Serial No. 268,620

13 Claims. (Cl. 154—3)

This invention relates to methods and apparatus for fabricating conveyer belting, particularly belting of the construction described and claimed in a co-pending divisional patent application Serial No. 402,303 filed by me on January 5, 1954, and characterized by having a flexible metallic core strip and a sheathing thereabout formed jointly by U section edge strips of rubber and opposite face layers likewise of rubber bonded to each other and to the core strip.

One of the aims of my present invention is to provide a simple method by which conveyer belting of the aforementioned construction can be expeditiously and economically produced in quantity in any desired lengths.

Another object of my present invention is to provide a simple and reliable apparatus suitable for the carrying out my improved method of conveyor fabrication in a rapid and continuous manner.

Other objects and attendant advantages will appear from the following detailed description of the attached drawings, wherein:

Fig. 6 is a view in horizontal section taken as indicated by the arrows VI—VI in Fig. 5.

Fig. 7 is a fragmentary view in top plan on an enlarged scale of one of the component elements of the apparatus.

Fig. 8 is a fragmentary detail view in section taken as indicated by the angled arrows VIII—VIII in Fig. 7.

Fig. 9 is a diagrammatic view like Fig. 1 of a modified apparatus for producing the type of conveyer belting shown in Fig. 3.

Fig. 10 is a diagrammatic view in turn like Fig. 1 of another modified apparatus for producing conveyer belting of the construction shown in Fig. 4.

Fig. 11 shows the apparatus in Fig. 10 in top plan.

Figs. 12, 13 and 14 are detail views in cross section taken as indicated by the angled arrows XII—XII, XIII—XIII, and XIV—XIV in Fig. 10 and drawn to a larger scale.

Figure 1:
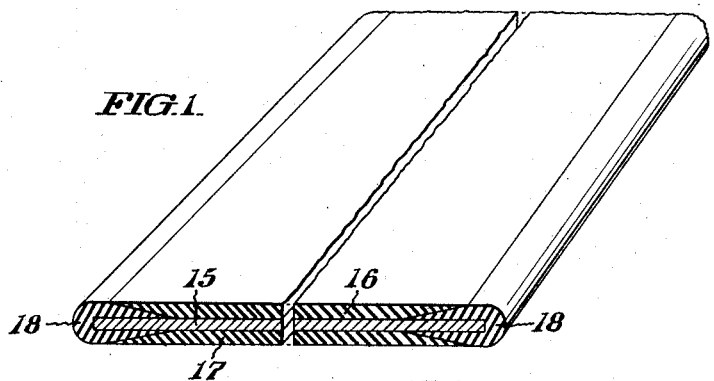
Figs. 1, 2, 3 and 4 are sectional perspective views of different forms of conveyer belting such as can be produced in accordance with my improved method and apparatus.

With more detailed reference first to Fig. 1 of these illustrations the belting there shown comprises a relatively thin foundation or core strip 15 which may be of steel known as type 302 containing 18% chromium and 8% nickel having a semi-hard temper, and a thickness of .035 inch; and a sheathing of vulcanized rubber including top and bottom sheet layers 16 and 17, and edge-enveloping binding strips 18, the component parts of the sheathing being mutually bonded one to another and to said metallic core strip. Steels of composition other than the type mentioned by way of example, as well as other sufficiently hard flexible stretch resistant methods, can be employed of course for the foundation or core strip 15 if desired. As shown, the edging strips 18 are U-shaped in cross section and have sharply beveled margins that lap corresponding marginal areas along the longitudinal side edges of the core strip 15. The rubber face layers 16, 17 also have sharply beveled margins to coincide with and overlap the bevels of the edging strips 18 and, in this instance, are of a thickness to come flush with said edging strips.

The rubber used for the sheathing may be either of the natural variety, or one of the synthetic kinds such as neoprene or a copolymer such as acrylonitrile-butadiene, styrene-butadiene or isobutylene-butadiene. The thickness of the sheathing may be from about $\frac{1}{16}$ to $\frac{3}{8}$ inch according to the particular use for which the belting is intended.

Figure 2:
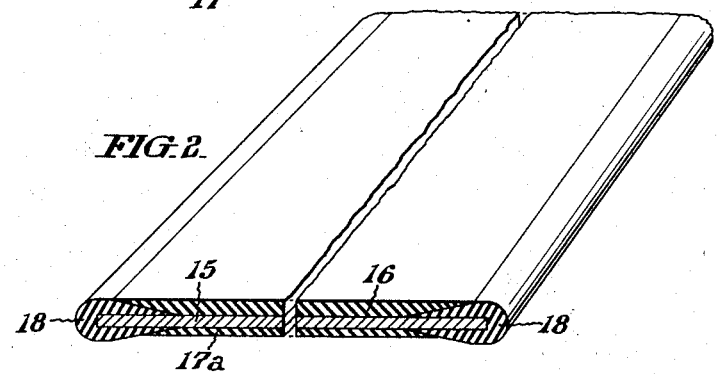

The belting of Fig. 2 is like that of Fig. 1 except in that the bottom face layer 17a of rubber is somewhat thinner than the upper face layer 16.

Figure 3:
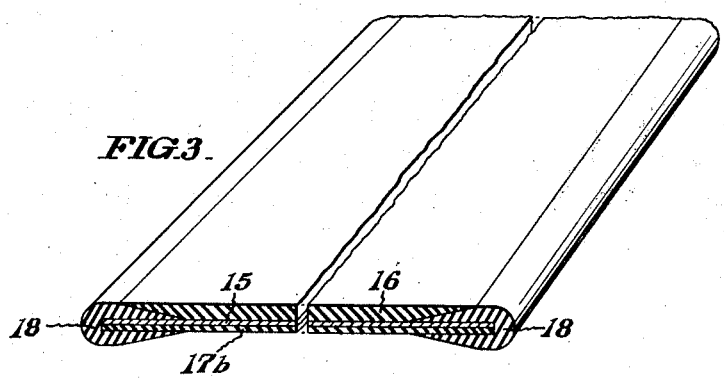

In the belting of Fig. 3, the bottom rubber face layer 17b is thin like that of Fig. 2 but of the same width as the metallic core strip 15 to which it is directly bonded. The rubber edging strips 18 are like those of the previous constructions, but their bottom flanges are overlapped upon and bonded to the thin bottom rubber layer 17b.

Figure 4:
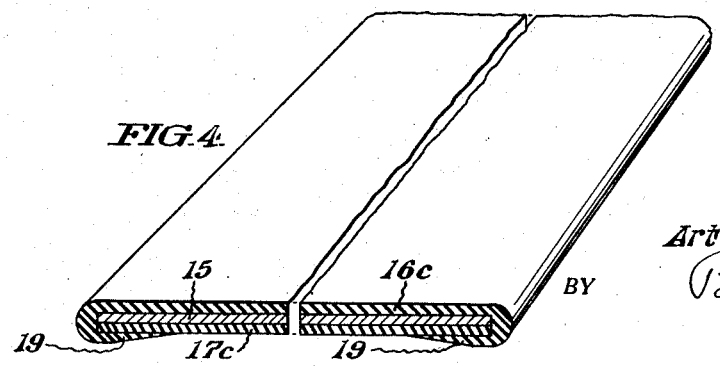

In Fig. 4 the bottom layer 17c corresponds in width to the metallic core strip 15 and is bonded thereto as in Fig. 3. In this instance, however, the upper rubber layer 16c is wider than the metallic core strip 15 and the sharply beveled margins 19 thereof, after being turned about the side edges of the core strip 15, are overlapped upon or placed under the bottom rubber layer 17c.

Figure 5:
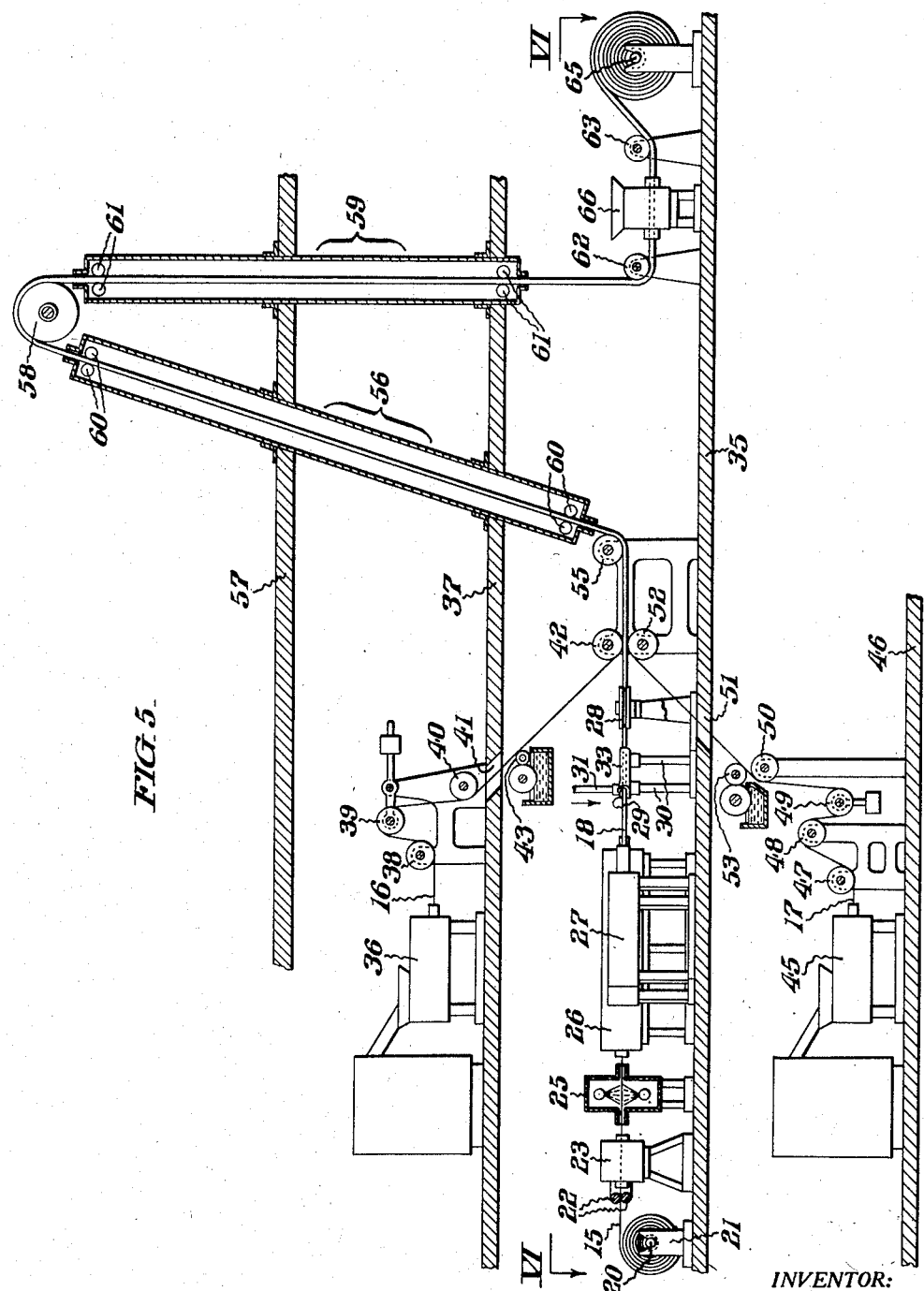
Fig. 5 is a diagrammatic view partly in side elevation and partly in longitudinal section, of an apparatus suitable for the production, in accordance with my invention, of conveyer belting of the forms shown in Figs. 1 and 2.

In the apparatus diagrammatically illustrated in Figs. 5–8, which I have devised for the continuous commercial production of belting characterized as in Figs. 1 and 2, the metallic core strip 15 is drawn horizontally from a supply reel 20 rotatively supported in fixed standards 21. Upon leaving reel 20, core strip 15 passes between edge grinders 22. This removes imperfections which otherwise would cause the steel to crack at right angles to the edge. The strip is then passed through a sand blasting and/or acid etching chamber 23 for cleaning and surface roughening, and then through a spraying chamber 25 for coating of its surfaces with a suitable primer or rubber-bonding adhesive, such as a neoprene solution. In its further advance, core strip 15 traverses a heated chamber 26 for partial setting of the bonding adhesive. The edging strips 18 are continuously discharged as uncured rubber strands, U-shaped in cross section, by extruders 27 laterally spaced from opposite sides of the chamber 26, and are advanced through complementally converging paths toward grooved rolls 28 whereby they are run onto the longitudinal side edges of the metallic core strip 15, the rate of discharge from the extruders being regulated to correspond with the rate of the strip progression in the apparatus. As the edging strips 18 pass to the rolls 28, they are opened up somewhat by tapered spreaders 29 so as to facilitate their engagement over the side edges of metallic core strip 15. As illustrated in Fig. 8, the spreaders 29 are made hollow to function additionally as nozzles, and are provided with slot apertures 32 through which rubber-bonding adhesive of the kind hereinbefore referred to, is discharged onto the inner surfaces of the grooves of the edging strips 18 in a manner readily understood. Each spreader nozzle 29 is supported by a standard 30, and the fluent adhesive is conducted to it by way of pipe 31. Associated with each spreader nozzle 29 is a flared rounded guard 33 which is relied upon to constrain the corresponding edging strip 18 as it wipes past said nozzle. The elements thus far described are all arranged upon one floor 35 of a suitable building as shown in Fig. 5.

The uncured rubber strip for the upper facing layer 16 of the belting is continuously discharged from an extruder or calendering machine 36 on an upper floor 37 of the building. In leaving the extruder 36, the rubber face layer 16 first under-runs a guide roll 38, then over-runs a weight-balanced compensating roll 39, and then under-runs a guide roll 40 whereby it is directed downwardly through a slot 41 in the floor 37 to a pair of transverse press rolls 42, 52 immediately beyond the edge strip guiding rolls 28 on floor 35. En route to roll 42, bonding adhesive is applied to the surface of the top layer 16 by an applicator indicated at 43 in Fig. 5.

The bottom facing layer 17 for the belting is similarly discharged continuously as a flat strand of uncured rubber from an extruder or calendering machine 45 on the floor 46 below floor 35 of the building and, it being advanced, first under-runs a guide roll 47, then over-runs a second guide roll 48 at a higher level, then under-runs a weighted compensating roll 49, and then over-runs another guide roll 50 whereby it is directed to pass forwardly and upwardly at an inclination through a slot 51 in floor 35 to transverse press rolls 42, 52. Before reaching the rolls 42, 52, rubber bonding adhesive is applied to the surface of the rubber layer 17 by the applicator indicated at 53. In passing between the press rolls 42 and 52, the top and bottom facing layers 16 and 17 and the edging strips 18 are firmly pressed against the core strip 15 in the relation shown in Fig. 1 or in Fig. 2, to form a completely integrating sheath around said core strip. Somewhat beyond rolls 42, 52 is a guide roll 55 about which the now-assembled belting is redirected to traverse upwardly through a vertically-disposed heated chamber 56 for curing of the rubber sheathing elements 16–18 and permanent bonding thereof to core strip 15. As shown, the chamber 56 is made quite high to afford ample time for proper curing of the rubber the same extending up through floor 37 and also through still another floor 57 above. Upon emergence from the top of chamber 56, the now cured belting overpasses a guide roll 58, it being thereby reversed in the direction of its progression to travel downwardly through a cooling chamber 59, which, like chamber 56, is vertically disposed and substantially of the same height. Nip rolls, indicated at 60 and 61, aid in advancing the belting through chambers 56 and 59. As the finished belting passes out of the bottom of cooling chamber 59, it is redirected by longitudinally-spaced guide rolls 62 and 63 to pass horizontally to a collecting reel 65 on floor 35. Disposed in the interval between rolls 62 and 63 is a duster 66 through which the belting is passed for application thereto of talcum powder or the like before being wound upon the reel 65.

It is to be understood that in practice, suitable powered transmission mechanism is provided for positively driving the rolls 42, 52, 55, 58, 62, 63, and the take-up reel 65 so that the core strip 15 and the belting are all advanced in the apparatus at a uniform linear speed. The same is true with regard to the drive of rolls 28, 38, 40, 47, 48, and 50, so that the rubber edging strips 18 and the rubber facing layers 16 and 17 are evenly fed at the proper rate to prevent either stretching or buckling thereof as they meet with the metallic core strip 15. The process is thus made continuous and this is of great importance in the commercial use of the invention.

The apparatus of Fig. 9 for commercially producing conveyer belting characterized as in Fig. 3, is identical with the apparatus of Figs. 5 and 6 except that a guide roll 70 is provided for directing the lower face layer 17b to the core strip 15 in advance of the region where the edging strips are run onto said core strip. In this instance, the use of an adhesive applicator such as shown at 53 in Fig. 5 is unnecessary. In order to preclude the necessity for repetitive description, all the other elements shown in Fig. 9 not specifically referred to but having their counterparts in the first described embodiment, are designated by the same reference numerals previously employed.

In the apparatus of Figs. 10 and 11 for commercially producing conveyer belting characterized as in Fig. 4, a guide roll 71 is provided for directing the upper rubber facing layer 16c to the core strip somewhat after the lower core strip 17c is delivered by the roll 70. Beyond roll 71 is a flat horizontally arranged folder 72 which gradually diminishes in width from its flattened entrant end toward its discharge end as shown in Fig. 11, and which is spiralized along its sides as at 72a. Accordingly, as the top facing layer 16c traverses folder 72, its projecting beveled side margins are progressively folded downwardly and inwardly about the side edges of the core strip 15 to underlap the bottom facing layer 17c in a manner which will readily be understood from Figs. 12–14. The apparatus of Figs. 10 and 11 is devoid of edging strip extruding means such as is used in the apparatus of Figs. 5 and 6 and in the apparatus of Fig. 9, since the extended turned under margins of the upper facing layer 16c serve in lieu of the edging strips of the embodiments illustrated in Figs. 1–3. Here again, all component elements shown to in Figs. 10 and 11 not particularly referred to but having their counterparts in the earlier described apparatus embodiments, are identified by the same reference numerals previously employed.

Having thus described my invention, I claim:

1. A continuous method of producing belting which comprises the steps of coating a core strip of relatively thin flexible sheet metal with fluent rubber-bonding adhesive; then applying U-section embracing strips of uncured rubber over the longitudinal side edges of the core strip; then applying layers of uncured sheet rubber each coated on one side with rubber bonding adhesive to opposite faces of the core strip so as to marginally overlap upon the edging strips; and thereafter subjecting the assemblage to curing treatment for setting of the rubber of the edge embracing strips and the rubber layers and bonding them to each other and to the core strip.

2. The method of producing belting according to claim 1 which includes the step of roughening the surfaces of the core strip before application thereto of the bonding adhesive.

3. The method of producing belting which comprises the steps of coating a foundational core strip of relatively thin flexible sheet metal with fluent rubber-bonding adhesive; then applying U-section embracing strips of uncured rubber with beveled margins over the longitudinal edges of the core strip; then applying layers of uncured sheet rubber with correspondingly beveled margins previously coated on the contacting sides with rubber-bonding adhesive, to opposite faces of the core strip so that their margins coincide with and marginally overlap upon the beveled margins of the edging strips; and thereafter subjecting the assemblage to curing treatment for setting the rubber of the edge embracing strips and the rubber layers and bonding them to each other and to the core strip.

4. The method of producing belting which comprises the steps of coating a foundational core strip of relatively thin flexible sheet metal with fluent rubber-bonding adhesive then applying a layer of uncured rubber of the same width to one face of the core strip; then applying marginally beveled embracing strips of uncured rubber about the longitudinal side edges of the metallic core strip and the aforesaid rubber layer, then applying a layer of uncured rubber with beveled edge margins to the opposite face of the metallic core strip so that its tapered margins coincide with and lap over the correspondingly tapered margins of the edging strips; and thereafter subjecting the assemblage to curing treatment to set the rubber of the edge strips and the rubber layers and to bond them to each other and to the core strip.

5. The method of producing belting which comprises the steps of coating a core strip of relatively thin flexible sheet metal with fluent rubber-bonding adhesive; then applying a layer of uncured rubber of the same width to one face of the metallic core strip; then applying a wider layer of uncured rubber coated on one side with bonding adhesive to the opposite face of the core strip and turning the marginal portions thereof about the side edges of the core strip into overlapping relation upon the first applied layer of rubber; and thereafter subjecting the assemblage to curing treatment to set the rubber of the two rubber layers and to bond them to each other and to the core strip.

6. The method of producing belting which comprises the steps of coating a foundational core strip of relatively thin flexible sheet metal with fluent rubber-bonding adhesive; then applying a layer of uncured rubber of the same width to one face of the metallic core strip; then applying a wider layer of uncured rubber with beveled margins and coated on the bottom face with rubber-bonding adhesive to the opposite face of the core strip and turning the beveled margins thereof about the side edges of the core strip into overlapping relation upon the first applied layer of rubber; and thereafter subjecting the assemblage to curing treatment to set the rubber of the two layers and to bond them to each other and to the core strip.

7. In apparatus for producing belting, means for linearly progressing a foundational core strip of thin flexible sheet metal; means along the line of progression of the core strip for coating it with rubber-bonding adhesive; means beyond the coating means for running U-section edging strips of uncured rubber onto the longitudinal side edges of the core strip; means further along the line of progression for applying to opposite faces of the core strip, continuous layers of uncured sheet rubber; and a heated chamber still further along in the line of progression traversed by the core strip with the applied rubber edging strips and facing layers, for curing the rubber edging strips and layers and bonding them to the core strip.

8. Apparatus according to claim 7 for producing belting, further including means ahead of the coating means for roughening the surfaces of the metallic core strip.

9. Apparatus according to claim 7 for producing belting, further including a drying chamber interposed in the line of progression immediately beyond the coating means, for partially setting the adhesive before application of the rubber edging strips and the rubber facing layers.

10. Apparatus according to claim 7 for producing belting, further including cooling chamber traversed by the belting after curing of the rubber in the heated chamber, and means beyond the cooling chamber for continuously collecting the finished belting.

11. Apparatus according to claim 7 for producing belting, further including means for coating the interior groove surfaces of the U-section edging strips with bonding adhesive as they are run onto the core strip.

12. In apparatus for producing belting, means for linearly progressing a continuous foundational core strip of thin flexible sheet metal; means in the line of progression for coating the strip with rubber-bonding adhesive; means beyond the coating means for applying to one surface of the core strip a layer of uncured sheet rubber of corresponding width; means further along in the line of progression for running U-section edging strips of uncured rubber onto the longitudinal side edges of the core strip and the previously-applied rubber layer aforesaid; means still further along in the line of progression for continuously applying to the opposite face of the core strip, a layer of uncured sheet rubber adhesive-coated on the contact side to marginally overlap the edging strips; and a heated chamber still further along in the line of progression traversed by the core strip with the assembled rubber edge strips and the rubber face layers for curing of the rubber and bonding of said edge strips and layers to each other and to the core strip.

13. In apparatus for producing belting, means for linearly progressing a continuous foundational core strip of thin flexible sheet metal; means along the path of progression for coating the core strip with rubber-bonding adhesive; means beyond the coating means for continuously applying to one face of the core strip, a layer of uncured sheet rubber of corresponding width; means further along the path of travel for continuously applying to the opposite face of the core strip a wider layer of uncured sheet rubber previously coated on the contacting side with bonding adhesive; means for turning the projecting margins of said wider layer about the longitudinal side edges of the core strip to overlap the rubber layer on the opposite side of said strip; and a heated chamber still further along in the path of travel traversed by the assembled belting for curing of the rubber of the two layers and bonding of them to each other and to the core strip.

References Cited in the file of this patent

UNITED STATES PATENTS

| Number | Name | Date |
|---|---|---|
| 2,194,833 | Nassimbene | Mar. 26, 1940 |
| 2,321,580 | Conradson | June 15, 1943 |
| 2,545,370 | Mittelmann | Mar. 13, 1951 |
| 2,565,684 | Haren et al. | Aug. 28, 1951 |

FOREIGN PATENTS

| Number | Country | Date |
|---|---|---|
| 3,288 | Great Britain | 1862 |
| 454,134 | Canada | Jan. 18, 1949 |